(12) United States Patent
Bahirat et al.

(10) Patent No.: US 12,517,822 B2
(45) Date of Patent: *Jan. 6, 2026

(54) ZONED NAMESPACE WITH ZONE GROUPING

(71) Applicant: SK hynix NAND Product Solutions Corp., Rancho Cordova, CA (US)

(72) Inventors: Shirish Bahirat, Longmont, CO (US); Michael Scott Allison, Longmont, CO (US); Mary Allison Goodman, Sacramento, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,691

(22) Filed: Aug. 16, 2024

(65) Prior Publication Data

US 2024/0411687 A1 Dec. 12, 2024

Related U.S. Application Data

(63) Continuation of application No. 18/373,483, filed on Sep. 27, 2023, now Pat. No. 12,093,173, which is a
(Continued)

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/064* (2013.01);
(Continued)

(58) Field of Classification Search
None
See application file for complete search history.

(56) References Cited

U.S. PATENT DOCUMENTS

| | | | |
|---|---|---|---|
| 10,996,863 B1 | 5/2021 | Kuzmin et al. | |
| 2008/0215800 A1 | 9/2008 | Lee et al. | |

(Continued)

FOREIGN PATENT DOCUMENTS

| | | |
|---|---|---|
| JP | 2018049522 | 3/2018 |
| KR | 10-2014-0035426 | 3/2014 |

(Continued)

OTHER PUBLICATIONS

Notice of Allowance dated Apr. 12, 2024 in KR Patent Application No. 10-2020-0123900, pp. 1-4.
(Continued)

*Primary Examiner* — Michael Alsip
(74) *Attorney, Agent, or Firm* — Byrne Poh LLP

(57) ABSTRACT

An embodiment of an electronic apparatus may include one or more substrates, and logic coupled to the one or more substrates, the logic to control access to two or more persistent storage devices, wherein at least one of the two or more persistent storage devices is to be logically organized with a namespace divided into two or more zones, determine two or more different zone size dependent parameters associated with the two or more persistent storage devices, determine a smallest aligned boundary based on each of the two or more different zone size dependent parameters, and set a zone group size for access to the two or more persistent storage devices based on the determined smallest aligned boundary. Other embodiments are disclosed and claimed.

21 Claims, 8 Drawing Sheets

Related U.S. Application Data continuation of application No. 16/723,878, filed on Dec. 20, 2019, now Pat. No. 11,797,433.

(52) U.S. Cl.
CPC .......... *G06F 3/0659* (2013.01); *G06F 3/0679* (2013.01); *G06F 3/0688* (2013.01)

(56) References Cited

U.S. PATENT DOCUMENTS

| | | |
|---|---|---|
| 2019/0146927 A1 | 5/2019 | Frolikov |
| 2020/0089407 A1 | 3/2020 | Baca et al. |
| 2020/0409589 A1 | 12/2020 | Bennett et al. |
| 2021/0089217 A1 | 3/2021 | Bjørling et al. |
| 2021/0318820 A1 | 10/2021 | Jin et al. |

FOREIGN PATENT DOCUMENTS

| | | |
|---|---|---|
| KR | 10-2019-0115072 | 10/2019 |
| KR | 10-2024-0007167 | 1/2024 |

OTHER PUBLICATIONS

Notice of Allowance dated May 24, 2024 in U.S. Appl. No. 18/373,483, pp. 1-9.
Notice of Allowance dated Jun. 13, 2023 in U.S. Appl. No. 16/723,878, pp. 1-18.
Notice of Allowance dated Aug. 14, 2024 in KR Patent Application No. 10-2024-0093347, pp. 1-10.
Notice of Allowance dated Dec. 6, 2024 in KR Patent Application No. 10-2024-0164468, pp. 1-5.
Office Action dated Jan. 18, 2023 in U.S. Appl. No. 16/723,878, pp. 1-14.
Office Action dated Nov. 6, 2023 in KR Patent Application No. 10-2020-0123900, pp. 1-5.

ZONED NAMESPACE WITH ZONE GROUPING

CROSS-REFERENCE TO RELATED APPLICATION

This application is a continuation of U.S. patent application Ser. No. 18/373,483, filed Sep. 27, 2023, which is a continuation of U.S. patent application Ser. No. 16/723,878, filed Dec. 20, 2019, each of which is hereby incorporated by reference herein in its entirety.

BACKGROUND

Conventional hard disk drives (HDDs) may utilize shingled magnetic recording (SMR) technology. Non-volatile memory (NVM) storage devices, such as NAND-based solid state drives (SSDs) may utilize a flash transition layer (FTL) to manage the NAND-based media. An NVM Express (NVMe) specification (NVMe 2.0 base specification, nvmexpress.org), provides for utilization of a Zoned Namespace (ZNS). The ZNS interface may require sequential writes to a zone, and the SMR interface may support sequential required and sequential preferred zones.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
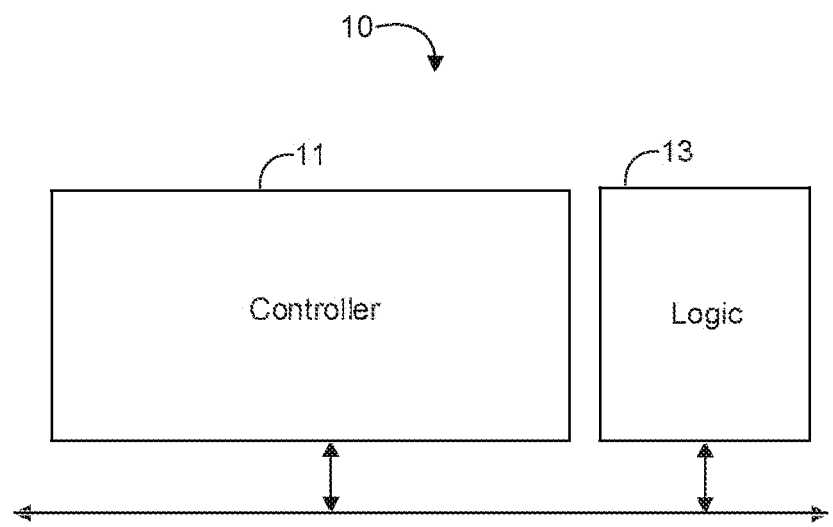
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic system 10 may include a controller 11, and logic 13 communicatively coupled to the controller 11. In accordance with some embodiments, the logic 13 may be configured to control access to two or more persistent storage devices, wherein at least one of the two or more persistent storage devices is to be logically organized with a namespace divided into two or more zones (e.g., a ZNS compliant with a NVMe specification). The logic 13 may be further configured to determine two or more different zone size dependent parameters associated with the two or more persistent storage devices, determine a smallest aligned boundary based on each of the two or more different zone size dependent parameters, and set a zone group size for access to the two or more persistent storage devices based on the determined smallest aligned boundary. For example, the logic 13 may be configured to determine a preferred zone size for an application, determine a first erase block size for a first storage device of the two or more persistent storage devices, and determine the smallest aligned boundary based on the preferred zone size and the first erase block size.

In some embodiments, the logic 13 may be configured to determine a second erase block size for a second storage device of the two or more persistent storage devices, and determine the smallest aligned boundary based on the preferred zone size, the first erase block size, and the second erase block size. For example, the first storage device may include a first type of NAND media and the second storage device may include a second type of NAND media which is different from the first type of NAND media. In some embodiments, the logic 13 may be further configured to determine a zone namespace sub-group capacity, and determine the smallest aligned boundary based on the preferred zone size, the first erase block size, and the zone namespace sub-group capacity. In some embodiments, the logic 13 may be additionally or alternatively configured to determine a zone namespace zone capacity, and determine the smallest aligned boundary based on the preferred zone size, the first erase block size, and the zone namespace zone capacity. In any of the embodiments herein, the at least one persistent storage device may include a SSD (e.g., a NAND-based SSD).

Embodiments of each of the above controller 11, persistent storage devices, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the persistent storage device(s), and/or the logic 13 may be located in, or co-located with, various components, including the controller 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the persistent storage device(s), other persistent storage media, or other system memory may store a set of instructions which when executed by the controller 11 cause the system 10 to implement one or more components, features, or aspects of the system 10 (e.g., the logic 13, determining two or more different zone size dependent parameters associated with the two or more persistent storage devices, determining a smallest aligned boundary based on each of the two or more different zone size dependent parameters, setting a zone group size for access to the two or more persistent storage devices based on the determined smallest aligned boundary, etc.).

Figure 2:
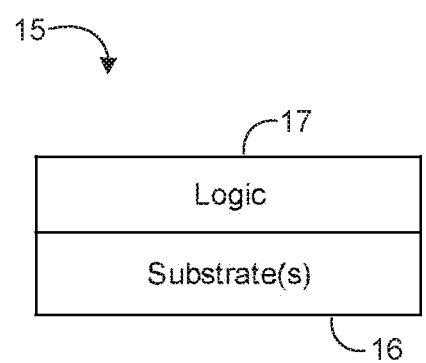
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to control access to two or more persistent storage devices, wherein at least one of the two or more persistent storage devices is to be logically organized with a namespace divided into two or more zones. The logic 17 may be further configured to determine two or more different zone size dependent parameters associated with the two or more persistent storage devices, determine a smallest aligned boundary based on each of the two or more different zone size dependent parameters, and set a zone group size for access to the two or more persistent storage devices based on the determined smallest aligned boundary. For example, the logic 17 may be configured to determine a preferred zone size for an application, determine a first erase block size for a first storage device of the two or more persistent storage devices, and determine the smallest aligned boundary based on the preferred zone size and the first erase block size.

In some embodiments, the logic 13 may be configured to determine a second erase block size for a second storage device of the two or more persistent storage devices, and determine the smallest aligned boundary based on the preferred zone size, the first erase block size, and the second erase block size. For example, the first storage device may include a first type of NAND media and the second storage device may include a second type of NAND media which is different from the first type of NAND media. In some embodiments, the logic 13 may be further configured to determine a zone namespace sub-group capacity, and determine the smallest aligned boundary based on the preferred zone size, the first erase block size, and the zone namespace sub-group capacity. In some embodiments, the logic 13 may be additionally or alternatively configured to determine a zone namespace zone capacity, and determine the smallest aligned boundary based on the preferred zone size, the first erase block size, and the zone namespace zone capacity. In any of the embodiments herein, the at least one persistent storage device may include a SSD (e.g., a NAND-based SSD).

Embodiments of the logic 17 may be implemented in a system, apparatus, computer, device, etc., for example, such as those described herein. More particularly, hardware implementations of the logic 17 may include configurable logic such as, for example, PLAS, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the logic 17 may be implemented on a semiconductor apparatus which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
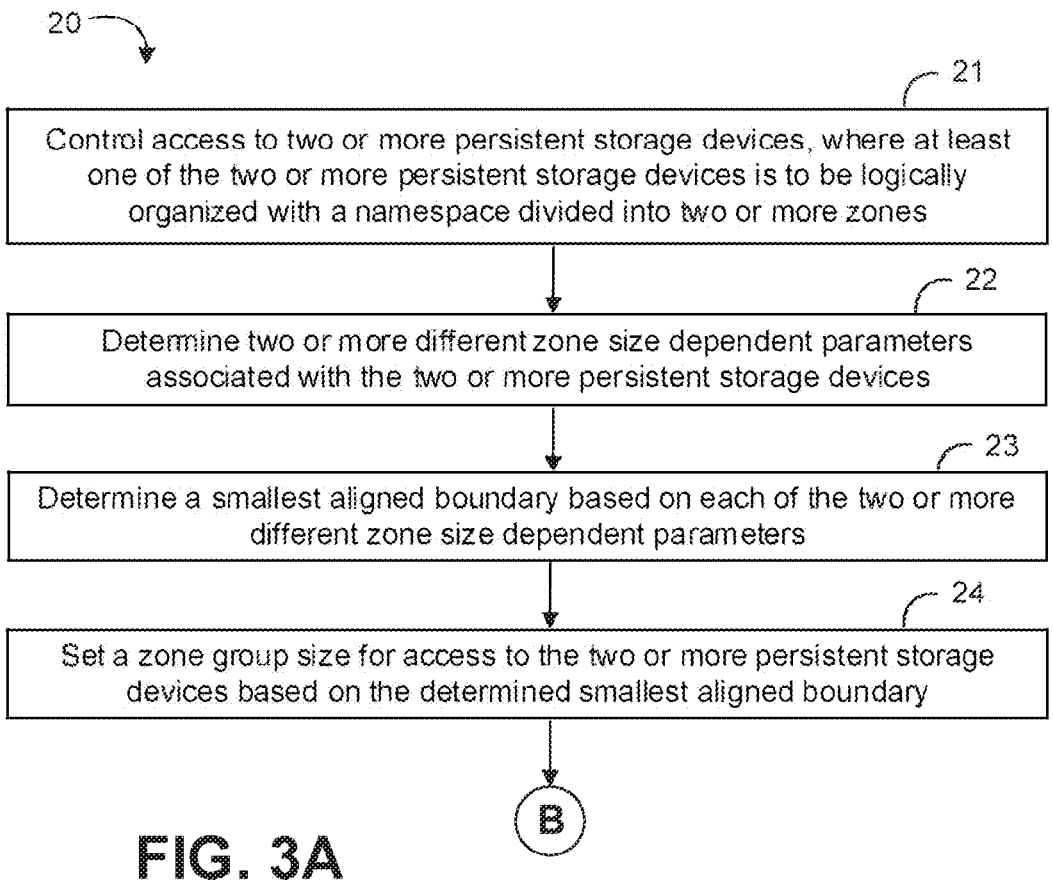
FIGS. 3A to 3C are flowcharts of an example of a method of controlling storage according to an embodiment.
Figure 3B:
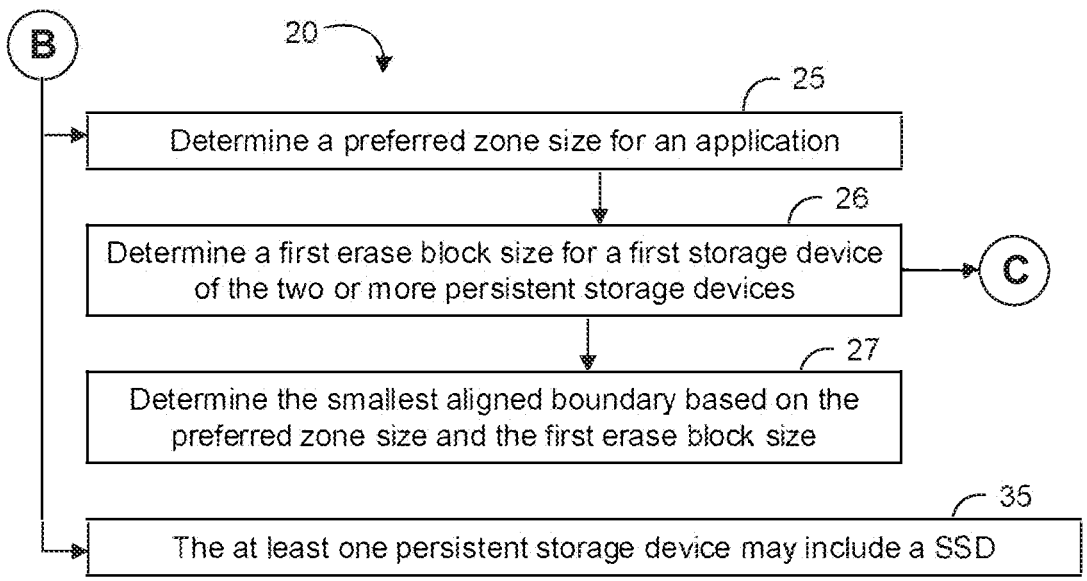
Figure 3C:
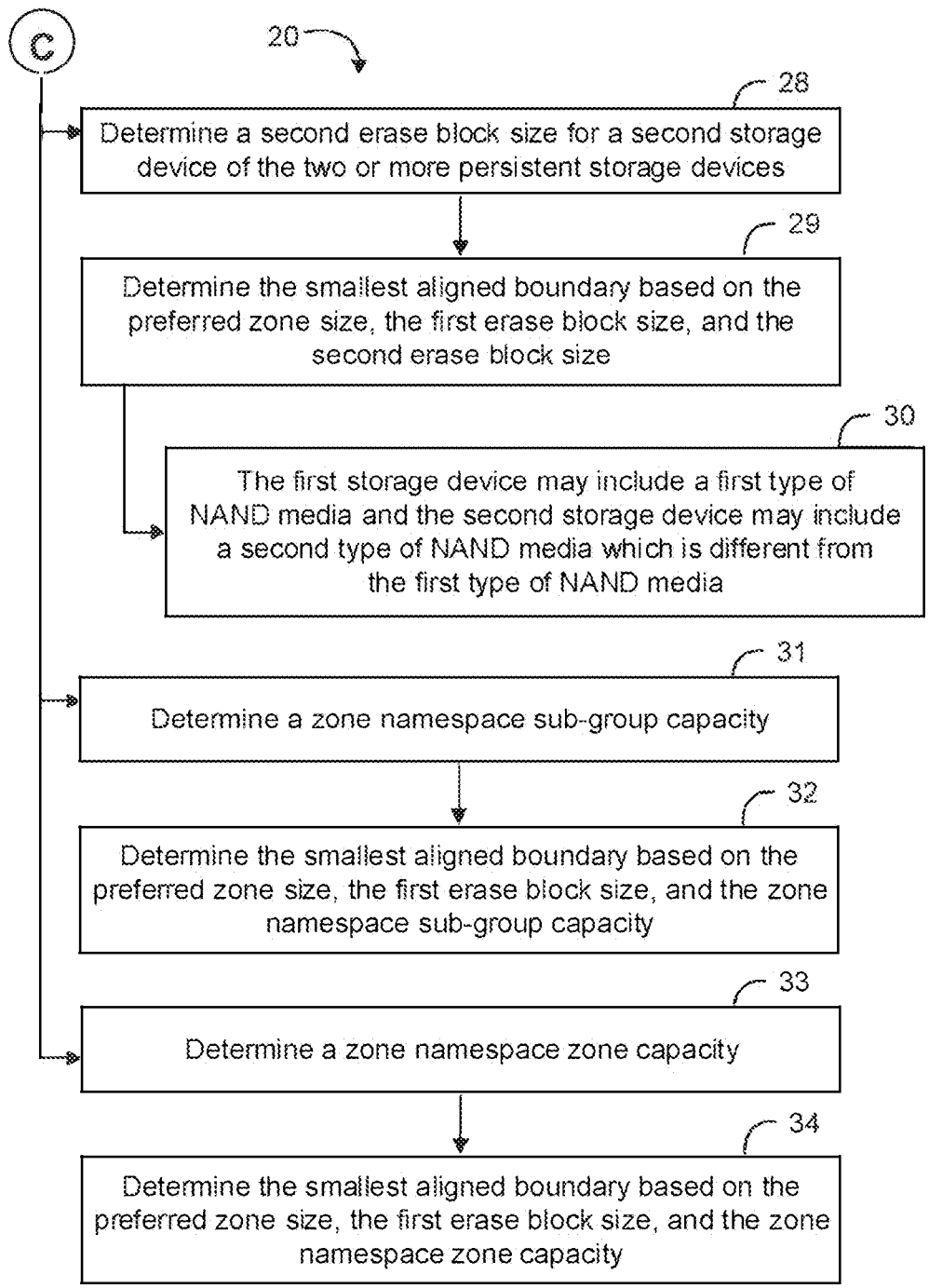

Turning now to FIGS. 3A to 3C, an embodiment of a method 20 of controlling storage may include controlling access to two or more persistent storage devices, where at least one of the two or more persistent storage devices is to be logically organized with a namespace divided into two or more zones at block 21, determining two or more different zone size dependent parameters associated with the two or more persistent storage devices at block 22, determining a smallest aligned boundary based on each of the two or more different zone size dependent parameters at block 23, and setting a zone group size for access to the two or more persistent storage devices based on the determined smallest aligned boundary at block 24. For example, the method 20 may include determining a preferred zone size for an application at block 25, determining a first erase block size for a first storage device of the two or more persistent storage devices at block 26, and determining the smallest aligned boundary based on the preferred zone size and the first erase block size at block 27.

Some embodiments of the method 20 may further include determining a second erase block size for a second storage device of the two or more persistent storage devices at block 28, and determining the smallest aligned boundary based on the preferred zone size, the first erase block size, and the second erase block size at block 29. For example, the first storage device may include a first type of NAND media and the second storage device may include a second type of NAND media which is different from the first type of NAND media at block 30. Some embodiments of the method 20 may further include determining a zone namespace sub-group capacity at block 31, and determining the smallest aligned boundary based on the preferred zone size, the first erase block size, and the zone namespace sub-group capacity at block 32. The method 20 may additionally or alternatively include determining a zone namespace zone capacity at block 33, and determining the smallest aligned boundary based on the preferred zone size, the first erase block size, and the zone namespace zone capacity at block 34. In any of the embodiments herein, the at least one persistent storage device may include a SSD at block 35.

Embodiments of the method 20 may be implemented in a system, apparatus, computer, device, etc., for example, such as those described herein. More particularly, hardware implementations of the method 20 may include configurable logic such as, for example, PLAS, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
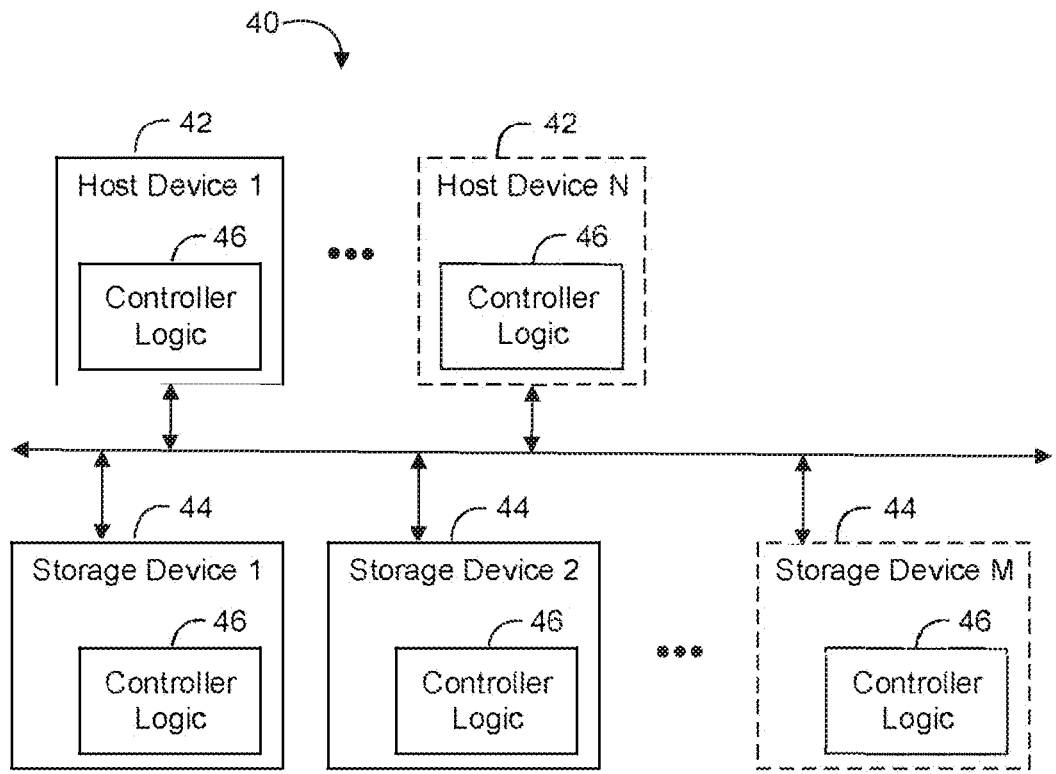
FIG. 4 is a block diagram of another example of a distributed electronic storage system according to an embodiment.

With reference to FIG. 4, an embodiment of a distributed electronic storage system 40 may include one or most host devices 42 communicatively coupled to two or more persistent storage devices 44. For example, one or more of the persistent storage devices 44 may include HDDs, one or more of the persistent storage devices 44 may include SSDs, one or more of the persistent storage devices 44 may include flash memory devices, etc. For example, the storage devices 44 may include different types of NAND-based media including single level cell (SLC), multi-level cell (MLC), triple level cell (TLC), quad level cell (QLC), etc. One or more of the storage devices 44 may support ZNS technology compliant with an NMVe specification.

Each of the host devices 42 and storage devices 44 may include controller logic 46. In accordance with some embodiments, the controller logic 46 may be configured to control access to the storage devices 44, including at least one storage device 44 which supports ZNS technology. The controller logic 46 may be further configured to determine two or more different zone size dependent parameters associated with the storage devices 44, determine a smallest aligned boundary based on each of the two or more different zone size dependent parameters, and set a zone group size for access to the storage devices 44 based on the determined smallest aligned boundary. For example, the controller logic 46 may be configured to determine a preferred zone size for an application on one of the host devices 42, determine a first erase block size for a first storage device of the storage devices 44, and determine the smallest aligned boundary based on the preferred zone size and the first erase block size.

In some embodiments, the controller logic 46 may be configured to determine a second erase block size for a second storage device of the storage devices 44, and determine the smallest aligned boundary based on the preferred zone size, the first erase block size, and the second erase block size. For example, the first storage device may include a first type of NAND media (e.g., TLC) and the second storage device may include a second type of NAND media (e.g., QLC). In some embodiments, the controller logic 46 may be further configured to determine a ZNS sub-group capacity, and determine the smallest aligned boundary based on the preferred zone size, the first erase block size, and the ZNS sub-group capacity. In some embodiments, the controller logic 46 may be additionally or alternatively configured to determine a ZNS zone capacity, and determine the smallest aligned boundary based on the preferred zone size, the first erase block size, and the ZNS zone capacity. As illustrated in FIG. 4, various aspects of the controller logic 46 may be distributed between the host devices 42 and the storage devices 44.

Embodiments of each of the above host devices 42, storage devices 44, controller logic 46, and other system components may be implemented in hardware, software, or any suitable combination thereof. For example, hardware implementations may include configurable logic such as, for example, PLAs, FPGAs, CPLDs, or fixed-functionality logic hardware using circuit technology such as, for example, ASIC, CMOS or TTL technology, or any combination thereof. Embodiments of the controller logic 46 may be included in a general purpose controller, a special purpose controller, a memory controller, a storage controller, a micro-controller, a general purpose processor, a special purpose processor, a central processor unit (CPU), an execution unit, etc.

Alternatively, or additionally, all or portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 5:
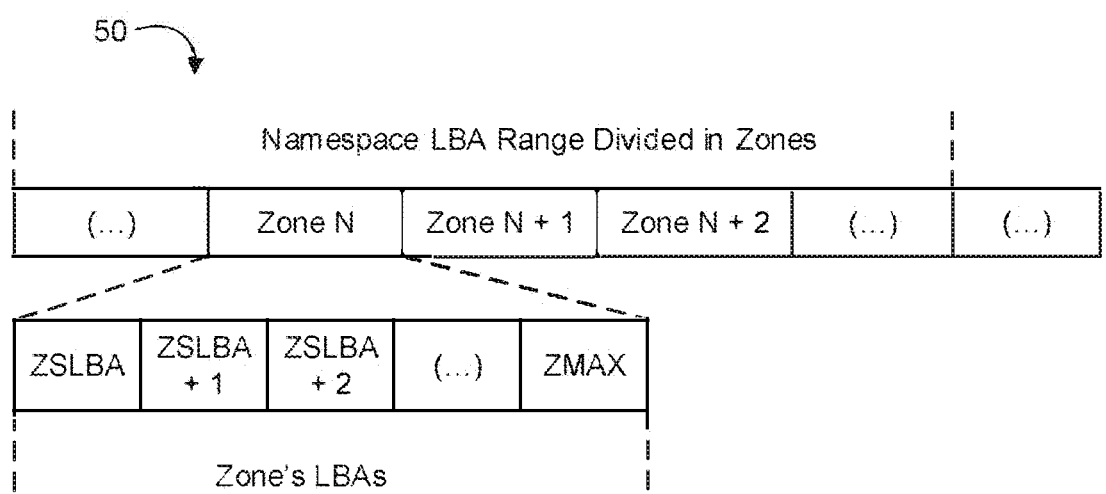
FIG. 5 is an illustrative diagram of an example of a zoned namespace according to an embodiment.

With reference to FIG. 5, an embodiment of a zoned namespace 50 may include a namespace range divided in zones including Zone N, Zone N+1, Zone N+2, etc., where N>0. Each Zone has a range of logical block addresses (LBAs) starting from the zone starting logical block address (ZSLBA) through ZMAX, where ZMAX=ZSLBA+ZSIZE (the size of the zone). As described in the NVMe 2.0 base specification, ZNS technology may utilize Zones with one or more of the following requirements: Zones create fixed size partitions of LBAs in a namespace; Zones support sequential write access, and random read access; Zone data is not logically moved by the device (e.g., the physical location may change due to media managements such as wear leveling, etc.); Zones must be explicitly reset to allow overwrites; and/or Zones only support an integer number of LBAs, and thus a multiple of the Zone size in writes/data. Some embodiments advantageously provide one or more additional functional capabilities to zoned namespaces.

Some embodiments may advantageously provide technology for zone grouping to improve or optimize platform and SSD parameters. For example, with QLC technology and lowering cost gaps with HDDs, high capacity storage in hyperscalers may more effectively utilize SSDs. ZNS technology may resolve various NAND challenges to enable a transition from HDDs to SSD for high capacity storage. For example, HDDs may be conventionally utilized with a zoned block device (ZBD) interface (e.g., zone block commands (ZBC) and/or zoned-device ATA commands (ZAC)) based on SMR. Existing ZBC/ZAC large-scale infrastructures can be leveraged towards efficient ZNS data management that utilizes QLC capabilities in a cost effective way. To achieve these cost and efficiency improvements, ZNS enables sequential data access where the SSDs define the LBAs instead of the host. Zones can be written and erased in their entirety thus eliminating need for defragmentation as well as easing out the internal data movements. Cost saving achieved through ZNS may be passed on to the user that not only includes reduced NAND costs but also reduction in DRAM and improved device endurance extending SSD lifespan.

There are various problems, however, in utilizing conventional ZNS technology to replace HDDs with SSDs. For example, one problem is that SMR echo systems do not have any zone size constraint because SMR zones can be configured to any required capacity. Conventionally, zone capacity on a flash device that supports ZNS is constrained by the "NAND physical erase block size". Platform or system level algorithms implement erasure coding to protect data. Erasure coding granularity drives the zone capacity requirement, as one erasure coded data blob cannot split into multiple blobs. That means flash-based zone capacity needs to be a multiple of erasure coding blob size. Each erase block capacity can be different for different NAND types (such as TLC, QLC, etc.) including number of pages per erase block, number of planes per sub block. These platform level requirements, cross platform SMR level implementations and NAND capability to configure a required Zone size creates challenging problem to hyperscalers for generalizing the software and ZNS implementation. A scale of this problem grows as multiple NAND SSD vendors utilize erase block sizes with different capacity.

Figure 6:
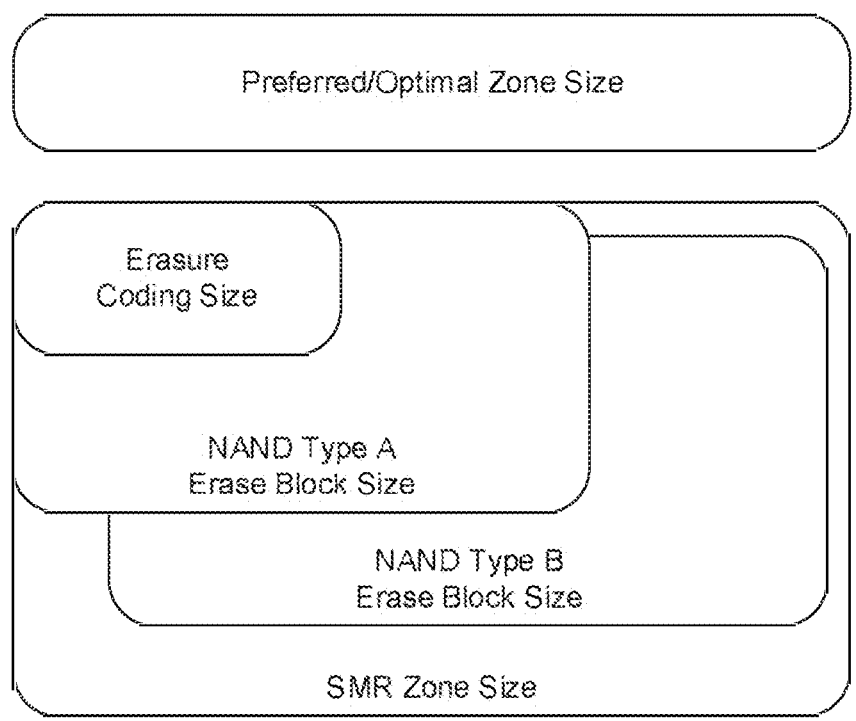
FIG. 6 is an illustrative diagram of examples of various size requirements and constraints according to an embodiment.

With reference to FIG. 6, an illustrative diagram of various size requirements and constraints shows how different sizes can create challenging situation for application software implementation. For example, a particular software application or storage need may have a preferred or optimal zone size, which may or may not map well to an erasure coding size, various erase block sizes for different types of NAND, etc. deployed in the storage system. The problem may be particularly difficult to overcome when adapting ZNS to standard block-based SSDs that are interchangeable across vendors, NAND types, and capacities. Advantageously, as described in more detail below, some embodiments may provide zone grouping technology to overcome this problem.

Another problem is that low cost hyperscalers may prefer a smallest feasible zone capacity to achieve better performance. Small zone size adds significant overhead on metadata, DRAM space requirements, and large log page sizes (e.g., that may go beyond practical implementation capabilities). For a 32 TB drive, for example, the log page that defines zone information has a size of 32 MB and transferring all the information over a PCIe bus can take more than 10 ms. With command latencies of hundreds of micro seconds, the overall latency and overhead to manage zones may be unacceptable for many applications. Advantageously, as described in more detail below, some embodiments may provide zone grouping technology to overcome this problem.

Another problem is that if the expected zone size and NAND physical block size does not align, the zone reset commands cannot invalidate all the data on physical blocks. This results in unexpected write amplification which may diminish returns in cost and endurance. Another problem is that, if the zone size does not align with the erase block size, some spare physical space gets unused thereby wasting some percentage of the NAND capacity for each zone. As described in more detail below, some embodiments advantageously provide zone grouping technology to overcome one or more of these problems.

Some embodiments advantageously provide zone grouping technology that aggregates zones in an aligned boundary that combines all or most critical boundaries. For example, a host may create a zone group that facilitates inclusion of all desired variables within single zone group. For example, NAND capacity is usually is aligned to some binary capacity. Some embodiments may generate zone groups based on the NAND capacity in such a way that: (1) data transfers and storage within zone group boundaries are seamless; (2) any internal variables such as NAND block size are hidden within zone groups; and/or (3) within each zone group, each zone follows same rules defined in the NVMe standard. Advantageously, all the host would do is define a zone group for any working combination utilized by the host.

Tables 1 through 3 show different examples for zone grouping in accordance with some embodiments. Table 1 shows a first zone group example with a NAND erase block size of 72 MB. Table 2 shows a second zone group example with a NAND erase block size of 96 MB. Table 3 shows a third zone group example with a NAND erase block size of 32 MB.

TABLE 1

| | |
|---|---|
| NAND Block Zone [MB] | 72 |
| Sub Group Capacity [MB] | 1152 |
| SMR Zone Group Capacity [MB] | 4608 |
| Number of ZNS Zones in Group | 9 |
| Number of ZNS Zones in SMR Groups | 36 |

TABLE 2

| | |
|---|---|
| NAND Block Zone [MB] | 96 |
| Sub Group Capacity [MB] | 1536 |
| SMR Zone Group Capacity [MB] | 1536 |
| Number of ZNS Zones in Group | 12 |
| Number of ZNS Zones in SMR Groups | 12 |

TABLE 3

| | |
|---|---|
| NAND Block Zone [MB] | 32 |
| Sub Group Capacity [MB] | 768 |
| SMR Zone Group Capacity [MB] | 1536 |
| Number of ZNS Zones in Group | 6 |
| Number of ZNS Zones in SMR Groups | 12 |

In accordance with some embodiment, a method of zone grouping may include finding a smallest aligned boundary of all zone size dependent parameters. For the first zone group, the zone group capacity can be 4608 MB for SMR zones, which includes four (4) ZNS sub groups. For example, each ZNS subgroup may include 9 zones as defined in the NVMe standard, where the ZNS zone size is 128 MB. Advantageously, the zone is constant across all variables, which facilitates seamless data transfer across zone group boundaries. For example, such seamless data transfer may be performed within a same zone group size or a different zone group size as basic unit of one ZNS zone capacity, which is constant across all of zone groups one through three in example Tables 1 through 3.

For purposes of explanation and not limitation, in another example a hyperscaler data center provider has two geographically distributed data center locations (e.g., one in Europe and one in the US). The data center stores data on SMR HDD and ZNS SSDs based on data hotness. Depending on usability data gets transferred between SMR zones and SSD zones. Also during outage and during replication, data gets transferred between the two geographically distributed data center locations.

In this example, the data center location in the US utilizes NAND flash devices that have block sizes of 32 MB and the data center location in Europe have SSDs with a 96 MB block size. A consistent erasure coding algorithm may require an example 128 MB zone size. Conventional ZNS technology may not support the consistent erasure coding algorithm for both data center locations because the different types of NAND have different block sizes. Conventionally, flash block size unaligned zones can increase write amplification, diminishing many or all benefits provided by ZNS technology. Advantageously, an embodiment of zone grouping technology may allow the different types of NAND technology to support the 128 MB zone size and allow each data center location to utilize the consistent erasure coding algorithm. When a SMR subgroup of 1536 MB is created as shown in last two tables in previous page, for example, the zoned SSD's of the Europe data center location may appear as a standard block device SSDs to the datacenter application software. With this group boundary, both NAND types can contain 12 zones with 128 MB capacity enabling data transfers across data centers, across SMR Zones and SSD zones at 1536 MB granularity. For example, a host can open one subgroup that includes 12 ZNS zones with 128 MB capacity. All zones can then be written in parallel and, depending on data life span, all zones within a zone group can be erased or transferred to SMR zones at the same time.

For the following example, the ZNS zone capacity may be 96 MB and the following equation may be utilized to determine the various zone groups and sizes:

$$\text{SMR Zone Size} = n * NAND \text{ Flash Erase blocks} \quad [\text{Eq. 1}]$$
$$= m * ZNS \text{ Zone Capacity}$$

Figure 7A:
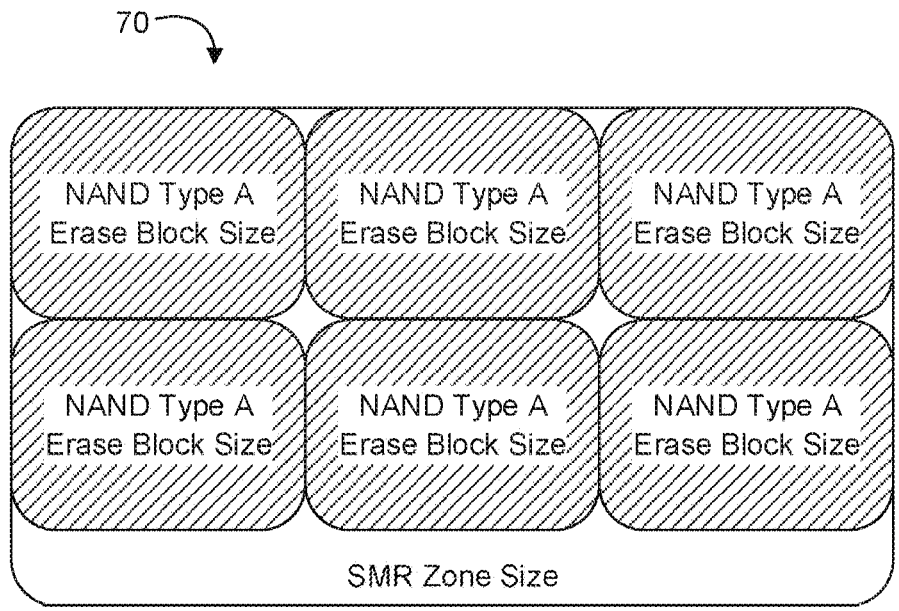
FIGS. 7A to 7B are block diagrams of an example of a zone group according to an embodiment.
Figure 7B:
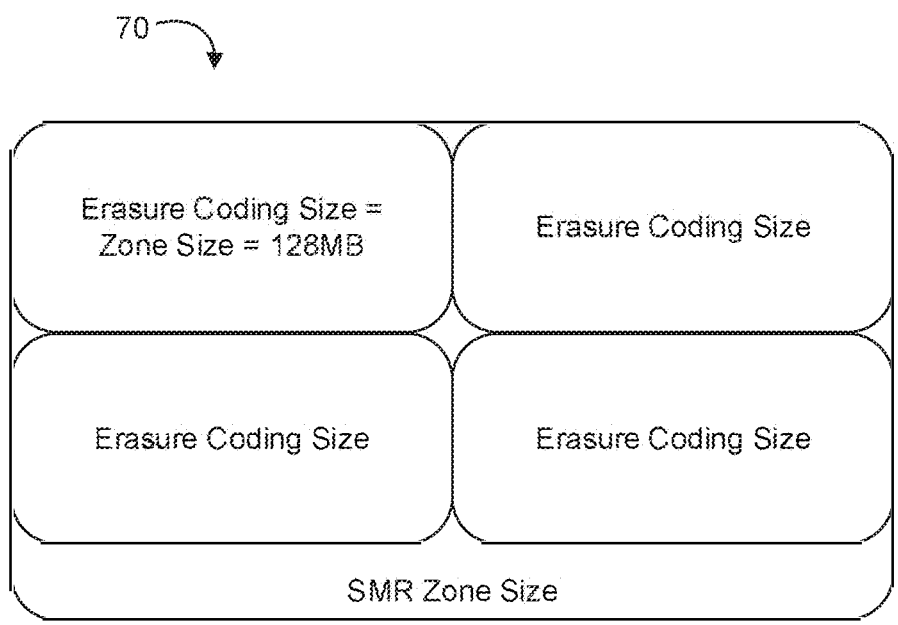

With reference to FIGS. 7A and 7B, an embodiment of a zone group 70 may include a SMR zone size that is multiple (e.g., m=4) of the ZNS zone capacity (e.g., 4*96 MB=384 MB) and also some multiple of the NAND flash erase block capacity (e.g., for EB=64 MB, then n=6*64=384 MB). The ZNS zones fit in the SMR Zone size as defined in right hand side of Eq. 1. Advantageously, suitable zone groups created in accordance with embodiments of the zone grouping technology described herein may be portable across any underlying hardware, including HDDs with SMR Zones and/or SSDs with any block size and technology. Some embodiments may advantageously enable scalability and generalization to make Zones more usable across a wide variety of platforms and applications. In other implementations, embodiments of zone group technology is not only used to align SMR zones to SSD zones, but also can be used to align SSD zones of one type of NAND to another type of NAND.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 8:
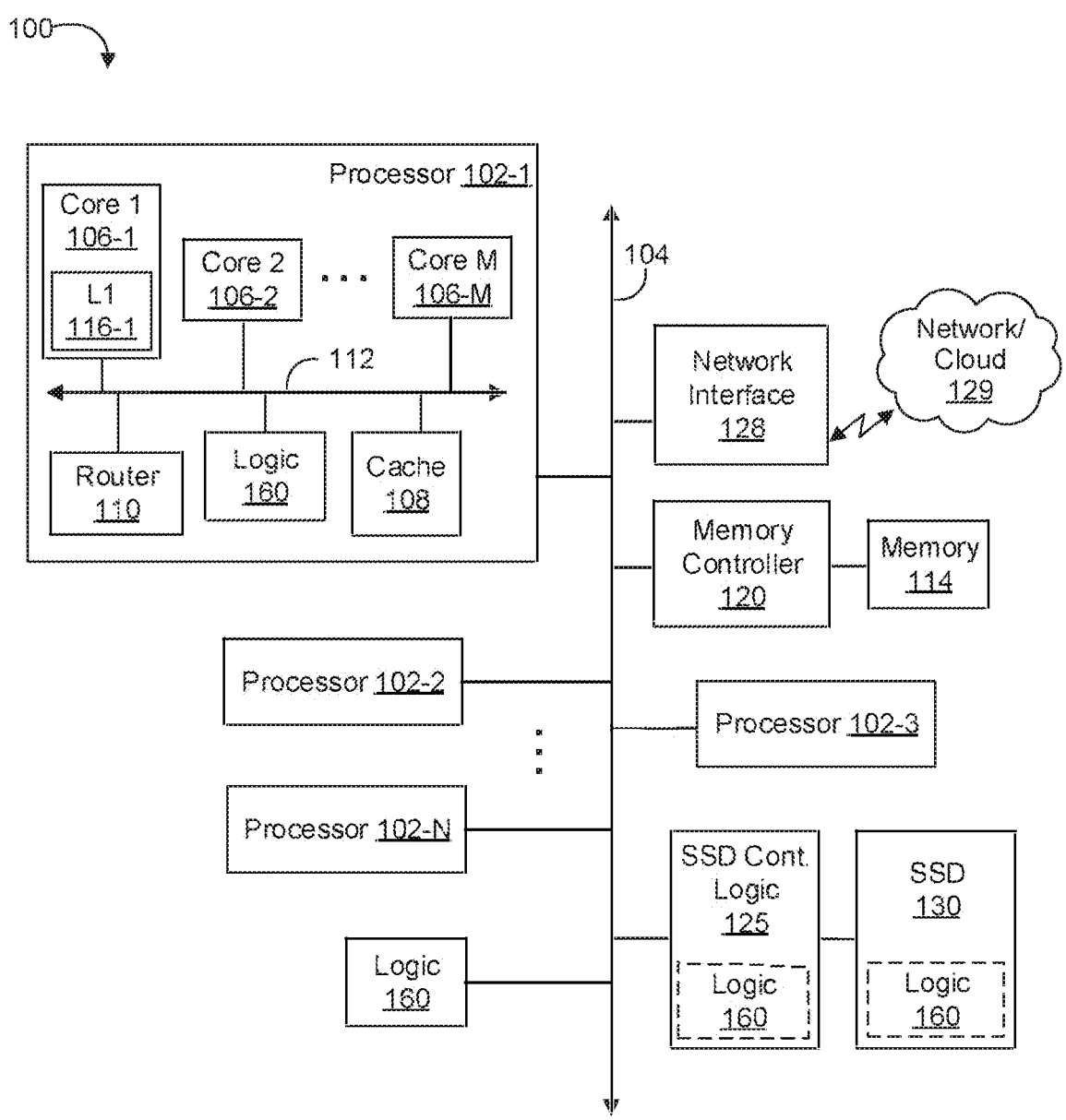
FIG. 8 is a block diagram of an example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 160, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 8, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, memory 114 may be coupled to other components of system 100 through a memory controller 120. Memory 114 may include volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SSD device 130 coupled to the interconnect 104 via SSD controller logic 125. Hence, logic 125 may control access by various components of system 100 to the SSD device 130. Furthermore, even though logic 125 is shown to be directly coupled to the interconnection 104 in FIG. 8, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 9) or provided on a same integrated circuit (IC) device in various embodiments (e.g., on the same circuit board device as the SSD device 130 or in the same enclosure as the SSD device 130).

Furthermore, logic 125 and/or SSD device 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD device 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

Figure 9:
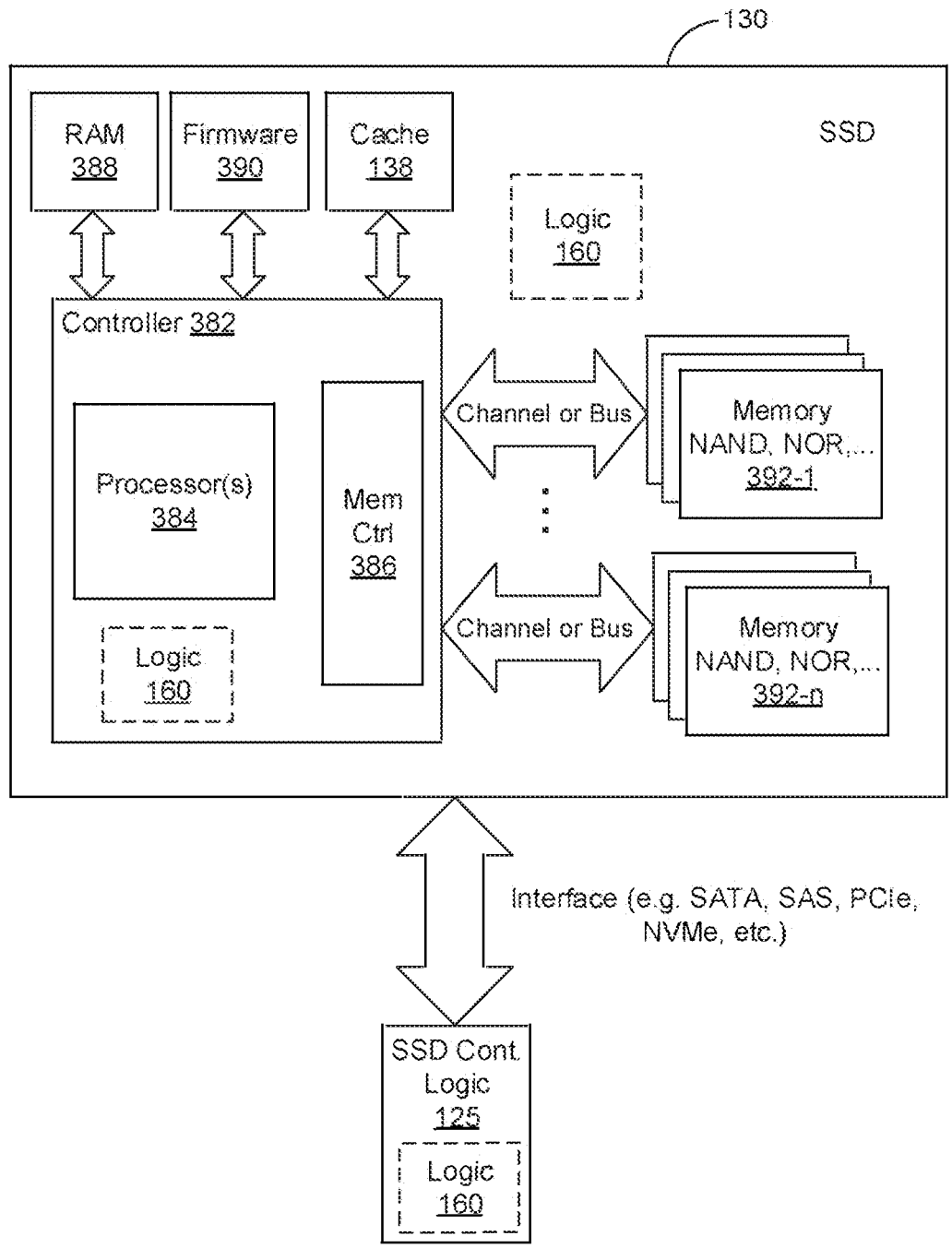
FIG. 9 is a block diagram of an example of a SSD according to an embodiment.

FIG. 9 illustrates a block diagram of various components of the SSD device 130, according to an embodiment. As illustrated in FIG. 9, logic 160 may be located in various locations such as inside the SSD device 130 or controller 382, etc., and may include similar technology as discussed in connection with FIG. 8. The SSD device 130 includes a controller 382 (which in turn includes one or more processor cores or processors 384 and memory controller logic 386), cache 138, RAM 388, firmware storage 390, and one or more memory devices 392-1 to 392-N (collectively memory 392, which may include NAND flash, NOR flash, or other types of non-volatile memory). The memory 392 is coupled to the memory controller logic 386 via one or more memory channels or busses. Also, SSD device 130 communicates with logic 125 via an interface (such as a SATA, SAS, PCIe, NVMe, etc., interface). One or more of the features/aspects/operations discussed with reference to FIGS. 1-7B may be performed by one or more of the components of FIGS. 8 and/or 9. Processors 384 and/or controller 382 may compress/decompress (or otherwise cause compression/decompression of) data written to or read from memory devices 392-1 to 392-N. Also, one or more of the features/aspects/operations of FIGS. 1-7B may be programmed into the firmware 390. Further, SSD controller logic 125 may also include logic 160.

As illustrated in FIGS. 8 and 9, the SSD device 130 may include logic 160, which may be in the same enclosure as the SSD device 130 and/or fully integrated on a printed circuit board (PCB) of the SSD device 130. The system 100 may include further logic 160 outside of the SSD device 130. Advantageously, the logic 160 may include technology to implement one or more aspects of the system 10, the apparatus 15, the method 20 (FIGS. 3A to 3C), the system 40 (FIG. 4), the zoned namespace 50 (FIG. 5), the zone group 70 (FIGS. 7A and 7B), and/or any of the features discussed herein. For example, the logic 160 may include technology to implement the host device/computer system/agent aspects of the various embodiments described herein (e.g., requesting information from the SSD device 130, sending information to the SSD device 130, creating zone groups, etc.) and also technology to implement NVMe ZNS technology and to logically organize the SSD device 130 with a namespace divided into two or more zones. The logic 160 may be further configured to determine two or more different zone size dependent parameters associated with two or more storage devices (e.g., including the SSD device 130), determine a smallest aligned boundary based on each of the two or more different zone size dependent parameters, and set a zone group size for access to the storage devices based on the determined smallest aligned boundary. For example, the logic 160 may be configured to determine a preferred zone size for an application on one of the processors 102, determine a first erase block size for a first storage device of the storage devices, and determine the smallest aligned boundary based on the preferred zone size and the first erase block size.

In some embodiments, the logic 160 may be configured to determine a second erase block size for a second storage device of the storage devices, and determine the smallest aligned boundary based on the preferred zone size, the first erase block size, and the second erase block size. For example, the first storage device may include a first type of NAND media (e.g., TLC) and the second storage device may include a second type of NAND media (e.g., QLC). In some embodiments, the logic 160 may be further configured to determine a ZNS sub-group capacity, and determine the smallest aligned boundary based on the preferred zone size, the first erase block size, and the ZNS sub-group capacity. In some embodiments, the logic 160 may be additionally or alternatively configured to determine a ZNS zone capacity, and determine the smallest aligned boundary based on the preferred zone size, the first erase block size, and the ZNS zone capacity.

In other embodiments, the SSD device 130 may be replaced with any suitable storage/memory technology/media. In some embodiments, the logic 160 may be coupled to one or more substrates (e.g., silicon, sapphire, gallium arsenide, printed circuit board (PCB), etc.), and may include transistor channel regions that are positioned within the one or more substrates. In other embodiments, the SSD device 130 may include two or more types of storage media. For example, the bulk of the storage may be NAND and may further include some faster, smaller granularity accessible (e.g., byte-addressable) NVM such as INTEL 3DXP media. The SSD device 130 may alternatively, or additionally, include persistent volatile memory (e.g., battery or capacitor backed-up DRAM or SRAM). For example, the SSD device 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIG. 8, features or aspects of the logic 160 may be distributed throughout the system 100, and/or co-located/integrated with various components of the system 100.

ADDITIONAL NOTES AND EXAMPLES

Example 1 includes an electronic apparatus, comprising one or more substrates, and logic coupled to the one or more substrates, the logic to control access to two or more persistent storage devices, wherein at least one of the two or more persistent storage devices is to be logically organized with a namespace divided into two or more zones, determine two or more different zone size dependent parameters associated with the two or more persistent storage devices, determine a smallest aligned boundary based on each of the two or more different zone size dependent parameters, and set a zone group size for access to the two or more persistent storage devices based on the determined smallest aligned boundary.

Example 2 includes the apparatus of Example 1, wherein the logic is further to determine a preferred zone size for an application, determine a first erase block size for a first storage device of the two or more persistent storage devices, and determine the smallest aligned boundary based on the preferred zone size and the first erase block size.

Example 3 includes the apparatus of Example 2, wherein the logic is further to determine a second erase block size for a second storage device of the two or more persistent storage devices, and determine the smallest aligned boundary based on the preferred zone size, the first erase block size, and the second erase block size.

Example 4 includes the apparatus of Example 3, wherein the first storage device includes a first type of NAND media and the second storage device includes a second type of NAND media which is different from the first type of NAND media.

Example 5 includes the apparatus of any of Examples 2 to 4, wherein the logic is further to determine a zone namespace sub-group capacity, and determine the smallest aligned boundary based on the preferred zone size, the first erase block size, and the zone namespace sub-group capacity.

Example 6 includes the apparatus of any of Examples 2 to 5, wherein the logic is further to determine a zone namespace zone capacity, and determine the smallest aligned boundary based on the preferred zone size, the first erase block size, and the zone namespace zone capacity.

Example 7 includes the apparatus of any of Examples 1 to 6, wherein the at least one persistent storage device comprises a solid state drive.

Example 8 includes an electronic system, comprising a controller, and logic communicatively coupled to the controller, the logic to control access to two or more persistent storage devices, wherein at least one of the two or more persistent storage devices is to be logically organized with a namespace divided into two or more zones, determine two or more different zone size dependent parameters associated with the two or more persistent storage devices, determine a smallest aligned boundary based on each of the two or more different zone size dependent parameters, and set a zone group size for access to the two or more persistent storage devices based on the determined smallest aligned boundary.

Example 9 includes the system of Example 8, wherein the logic is further to determine a preferred zone size for an application, determine a first erase block size for a first storage device of the two or more persistent storage devices, and determine the smallest aligned boundary based on the preferred zone size and the first erase block size.

Example 10 includes the system of Example 9, wherein the logic is further to determine a second erase block size for a second storage device of the two or more persistent storage devices, and determine the smallest aligned boundary based on the preferred zone size, the first erase block size, and the second erase block size.

Example 11 includes the system of Example 10, wherein the first storage device includes a first type of NAND media and the second storage device includes a second type of NAND media which is different from the first type of NAND media.

Example 12 includes the system of any of Examples 9 to 11, wherein the logic is further to determine a zone namespace sub-group capacity, and determine the smallest aligned boundary based on the preferred zone size, the first erase block size, and the zone namespace sub-group capacity.

Example 13 includes the system of any of Examples 9 to 12, wherein the logic is further to determine a zone namespace zone capacity, and determine the smallest aligned boundary based on the preferred zone size, the first erase block size, and the zone namespace zone capacity.

Example 14 includes the system of any of Examples 8 to 13, wherein the at least one persistent storage device comprises a solid state drive.

Example 15 includes a method of controlling storage, comprising controlling access to two or more persistent storage devices, wherein at least one of the two or more persistent storage devices is to be logically organized with a namespace divided into two or more zones, determining two or more different zone size dependent parameters associated with the two or more persistent storage devices, determining a smallest aligned boundary based on each of the two or more different zone size dependent parameters, and setting a zone group size for access to the two or more persistent storage devices based on the determined smallest aligned boundary.

Example 16 includes the method of Example 15, further comprising determining a preferred zone size for an application, determining a first erase block size for a first storage device of the two or more persistent storage devices, and determining the smallest aligned boundary based on the preferred zone size and the first erase block size.

Example 17 includes the method of Example 16, further comprising determining a second erase block size for a second storage device of the two or more persistent storage devices, and determining the smallest aligned boundary based on the preferred zone size, the first erase block size, and the second erase block size.

Example 18 includes the method of Example 17, wherein the first storage device includes a first type of NAND media and the second storage device includes a second type of NAND media which is different from the first type of NAND media.

Example 19 includes the method of any of Examples 16 to 18, further comprising determining a zone namespace sub-group capacity, and determining the smallest aligned boundary based on the preferred zone size, the first erase block size, and the zone namespace sub-group capacity.

Example 20 includes the method of any of Examples 16 to 19, further comprising determining a zone namespace zone capacity, and determining the smallest aligned boundary based on the preferred zone size, the first erase block size, and the zone namespace zone capacity.

Example 21 includes the method of any of Examples 15 to 20, wherein the at least one persistent storage device comprises a solid state drive.

Example 22 includes at least one non-transitory one machine readable medium comprising a plurality of instructions that, in response to being executed on a computing device, cause the computing device to control access to two or more persistent storage devices, wherein at least one of the two or more persistent storage devices is to be logically organized with a namespace divided into two or more zones, determine two or more different zone size dependent parameters associated with the two or more persistent storage devices, determine a smallest aligned boundary based on each of the two or more different zone size dependent parameters, and set a zone group size for access to the two or more persistent storage devices based on the determined smallest aligned boundary.

Example 23 includes the at least one non-transitory one machine readable medium of Example 22, comprising a plurality of further instructions that, in response to being executed on the computing device, cause the computing device to determine a preferred zone size for an application, determine a first erase block size for a first storage device of the two or more persistent storage devices, and determine the smallest aligned boundary based on the preferred zone size and the first erase block size.

Example 24 includes the at least one non-transitory one machine readable medium of Example 23, comprising a plurality of further instructions that, in response to being executed on the computing device, cause the computing device to determine a second erase block size for a second storage device of the two or more persistent storage devices, and determine the smallest aligned boundary based on the preferred zone size, the first erase block size, and the second erase block size.

Example 25 includes the at least one non-transitory one machine readable medium of Example 24, wherein the first storage device includes a first type of NAND media and the second storage device includes a second type of NAND media which is different from the first type of NAND media.

Example 26 includes the at least one non-transitory one machine readable medium of any of Examples 23 to 25, comprising a plurality of further instructions that, in response to being executed on the computing device, cause the computing device to determine a zone namespace sub-group capacity, and determine the smallest aligned boundary based on the preferred zone size, the first erase block size, and the zone namespace sub-group capacity.

Example 27 includes the at least one non-transitory one machine readable medium of any of Examples 23 to 26, comprising a plurality of further instructions that, in response to being executed on the computing device, cause the computing device to determining a zone namespace zone capacity, and determining the smallest aligned boundary based on the preferred zone size, the first erase block size, and the zone namespace zone capacity.

Example 28 includes the at least one non-transitory one machine readable medium of any of Examples 22 to 27, wherein the at least one persistent storage device comprises a solid state drive.

Example 29 includes a storage controller apparatus, comprising means for controlling access to two or more persistent storage devices, wherein at least one of the two or more persistent storage devices is to be logically organized with a namespace divided into two or more zones, means for determining two or more different zone size dependent parameters associated with the two or more persistent storage devices, means for determining a smallest aligned boundary based on each of the two or more different zone size dependent parameters, and means for setting a zone group size for access to the two or more persistent storage devices based on the determined smallest aligned boundary.

Example 30 includes the apparatus of Example 29, further comprising means for determining a preferred zone size for an application, means for determining a first erase block size for a first storage device of the two or more persistent storage devices, and means for determining the smallest aligned boundary based on the preferred zone size and the first erase block size.

Example 31 includes the apparatus of Example 30, further comprising means for determining a second erase block size for a second storage device of the two or more persistent storage devices, and means for determining the smallest aligned boundary based on the preferred zone size, the first erase block size, and the second erase block size.

Example 32 includes the apparatus of Example 31, wherein the first storage device includes a first type of NAND media and the second storage device includes a second type of NAND media which is different from the first type of NAND media.

Example 33 includes the apparatus of any of Examples 30 to 32, further comprising means for determining a zone namespace sub-group capacity, and means for determining the smallest aligned boundary based on the preferred zone size, the first erase block size, and the zone namespace sub-group capacity.

Example 34 includes the apparatus of any of Examples 30 to 33, further comprising means for determining a zone namespace zone capacity, and determining the smallest aligned boundary based on the preferred zone size, the first erase block size, and the zone namespace zone capacity.

Example 35 includes the apparatus of any of Examples 29 to 34, wherein the at least one persistent storage device comprises a solid state drive.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   two or more persistent storage devices, wherein a first storage device of the two or more persistent storage devices is organized into two or more first zones each having a first zone size, wherein a second storage device of the two or more persistent storage devices has a first erase block size; and
   one or more hardware processors configured at least to:
   set a zone group size that is used to access each of the two or more persistent storage devices, wherein the zone group size is:
   a first integer multiple of the first zone size; and
   a second integer multiple of the first erase block size, wherein the first integer multiple is different than the second integer multiple, and
   wherein the first zone size is different than the first erase block size.

2. The electronic apparatus of claim 1, wherein the one or more hardware processors are further configured to:
   determine a preferred zone size of a software application, wherein the first zone size is the preferred zone size of the software application.

3. The electronic apparatus of claim 1, wherein the one or more hardware processors are further configured to:
   determine a second erase block size for the first storage device,
   wherein the zone group size is also a third integer multiple of the second erase block size.

4. The electronic apparatus of claim 3, wherein the first storage device includes a first type of NAND media and the second storage device includes a second type of NAND media which is different from the first type of NAND media.

5. The electronic apparatus of claim 4, wherein:
   the first type of NAND media has the second erase block size, and
   the second type of NAND media has the first erase block size.

6. The electronic apparatus of claim 1, wherein the first storage device is organized into a first namespace that is divided into the two or more first zones, and wherein the one or more hardware processors are further configured to:
   determine a capacity of the first namespace, wherein the capacity of the first namespace is a fourth integer multiple of the zone group size.

7. The electronic apparatus of claim 1, wherein the second storage device comprises a solid state drive.

8. A non-transitory computer-readable medium containing computer executable instructions that, when executed by one or more processors, cause the one or more processors to perform a method for controlling storage, the method comprising:
   set a zone group size that is used to access each of two or more persistent storage devices, wherein a first storage device of the two or more persistent storage devices is organized into two or more first zones each having a first zone size, wherein a second storage device of the two or more persistent storage devices has a first erase block size, wherein the zone group size is:
   a first integer multiple of the first zone size; and
   a second integer multiple of the first erase block size, wherein the first integer multiple is different than the second integer multiple, and wherein the first zone size is different than the first erase block size.

9. The non-transitory computer-readable medium of claim 8, wherein the method further comprises:
determining a preferred zone size of a software application, wherein the first zone size is the preferred zone size of the software application.

10. The non-transitory computer-readable medium of claim 8, wherein the method further comprises:
determining a second erase block size for the first storage device,
wherein the zone group size is also a third integer multiple of the second erase block size.

11. The non-transitory computer-readable medium of claim 10, wherein the first storage device includes a first type of NAND media and the second storage device includes a second type of NAND media which is different from the first type of NAND media.

12. The non-transitory computer-readable medium of claim 11, wherein:
the first type of NAND media has the second erase block size, and
the second type of NAND media has the first erase block size.

13. The non-transitory computer-readable medium of claim 8, wherein the first storage device is organized into a first namespace that is divided into the two or more first zones, and wherein the method further comprises:
determining a capacity of the first namespace, wherein the capacity of the first namespace is a fourth integer multiple of the zone group size.

14. The non-transitory computer-readable medium of claim 8, wherein the second storage device comprises a solid state drive.

15. A method of controlling storage, comprising:
set a zone group size that is used to access each of two or more persistent storage devices, wherein a first storage device of the two or more persistent storage devices is organized into two or more first zones each having a first zone size, wherein a second storage device of the two or more persistent storage devices has a first erase block size, wherein the zone group size is:
a first integer multiple of the first zone size; and
a second integer multiple of the first erase block size,
wherein the first integer multiple is different than the second integer multiple, and wherein the first zone size is different than the first erase block size.

16. The method of claim 15, wherein the method further comprises:
determining a preferred zone size of a software application, wherein the first zone size is the preferred zone size of the software application.

17. The method of claim 15, wherein the method further comprises:
determining a second erase block size for the first storage device,
wherein the zone group size is also a third integer multiple of the second erase block size.

18. The method of claim 17, wherein the first storage device includes a first type of NAND media and the second storage device includes a second type of NAND media which is different from the first type of NAND media.

19. The method of claim 18, wherein:
the first type of NAND media has the second erase block size, and
the second type of NAND media has the first erase block size.

20. The method of claim 15, wherein the first storage device is organized into a first namespace that is divided into the two or more first zones, and wherein the method further comprises:
determining a capacity of the first namespace, wherein the capacity of the first namespace is a fourth integer multiple of the zone group size.

21. The method of claim 15, wherein the second storage device comprises a solid state drive.

* * * * *